(12) United States Patent
Canning et al.

(10) Patent No.: US 12,475,739 B2
(45) Date of Patent: Nov. 18, 2025

(54) AUTONOMOUS LIVESTOCK MONITORING

(71) Applicant: Cattle Eye Ltd, Belfast Antrim (GB)

(72) Inventors: Terry Canning, Belfast Antrim (GB); Adam Askew, Lurgan Antrim (GB); Ryan McMillan, Templepatrick Antrim (GB); Ian Thompson, Belfast Antrim (GB)

(73) Assignee: Cattle Eye Ltd., Belfast (GB)

( * ) Notice: Subject to any disclaimer, the term of this patent is extended or adjusted under 35 U.S.C. 154(b) by 440 days.

(21) Appl. No.: 18/013,466

(22) PCT Filed: Jan. 28, 2021

(86) PCT No.: PCT/EP2021/051991
§ 371 (c)(1),
(2) Date: Dec. 28, 2022

(87) PCT Pub. No.: WO2022/002443
PCT Pub. Date: Jan. 6, 2022

(65) Prior Publication Data
US 2023/0260327 A1    Aug. 17, 2023

(30) Foreign Application Priority Data
Jun. 30, 2020 (EP) .................................. 20183152

(51) Int. Cl.
*G06V 40/20* (2022.01)
*A01K 29/00* (2006.01)
(Continued)

(52) U.S. Cl.
CPC ............ *G06V 40/25* (2022.01); *A01K 29/005* (2013.01); *G06T 7/10* (2017.01); *G06T 7/20* (2013.01);
(Continued)

(58) Field of Classification Search
CPC ...... G06V 40/25; G06V 10/82; G06V 40/103; A01K 29/005; G06T 7/10; G06T 7/20;
(Continued)

(56) References Cited

U.S. PATENT DOCUMENTS

| 2012/0274442 | A1* | 11/2012 | Mottram | A01K 29/005 340/5.8 |
| 2020/0410669 | A1* | 12/2020 | Psota | G06T 7/0012 |
| 2021/0406530 | A1* | 12/2021 | Borchersen | A01K 11/00 |

FOREIGN PATENT DOCUMENTS

WO    WO-2017030448 A1 *  2/2017

OTHER PUBLICATIONS

Hansen MF, Smith ML, Smith LN, Abdul Jabbar K, Forbes D. Automated monitoring of dairy cow body condition, mobility and weight using a single 3D video capture device. Comput Ind. Jun. 2018;98:14-22. doi: 10.1016/j.compind.2018.02.011. PMID: 29997403; PMCID: PMC6034442. (Year: 2018).*

* cited by examiner

Primary Examiner — Matthew C Bella
Assistant Examiner — Andrew B. Jones
(74) Attorney, Agent, or Firm — Kenneth C. Booth; Booth Udall, PLC

(57) ABSTRACT

The present invention provides a method and a system for monitoring the mobility levels of individual farm animals and accordingly determining their corresponding mobility score. The mobility score may be indicative of the health and/or welfare status of the animals. The present invention processes a 2D video recording obtained from an imaging device to detect the movement of individual animals through a space. The video recording is segmented over a set of individual frames and in each frame the individual instances of the animal appearing in the vide frame are detected. The detected instances of each animal over a number of frames (Continued)

are grouped together. From each detected instance of an individual animal a set of reference points are extracted. The reference points are associated with location on the animal body. The present invention determines the mobility score of each animal by monitoring the relative position between reference points in each frame and the relative position of each reference point across the set of individual frames associated with an animal.

20 Claims, 13 Drawing Sheets

(51) Int. Cl.
*G06T 7/10* (2017.01)
*G06T 7/20* (2017.01)
*G06V 10/82* (2022.01)
(52) U.S. Cl.
CPC .... *G06V 10/82* (2022.01); *G06T 2207/10016* (2013.01); *G06T 2207/20084* (2013.01)
(58) Field of Classification Search
CPC . G06T 2207/10016; G06T 2207/20084; G06T 2207/30232; G06T 7/246
See application file for complete search history.

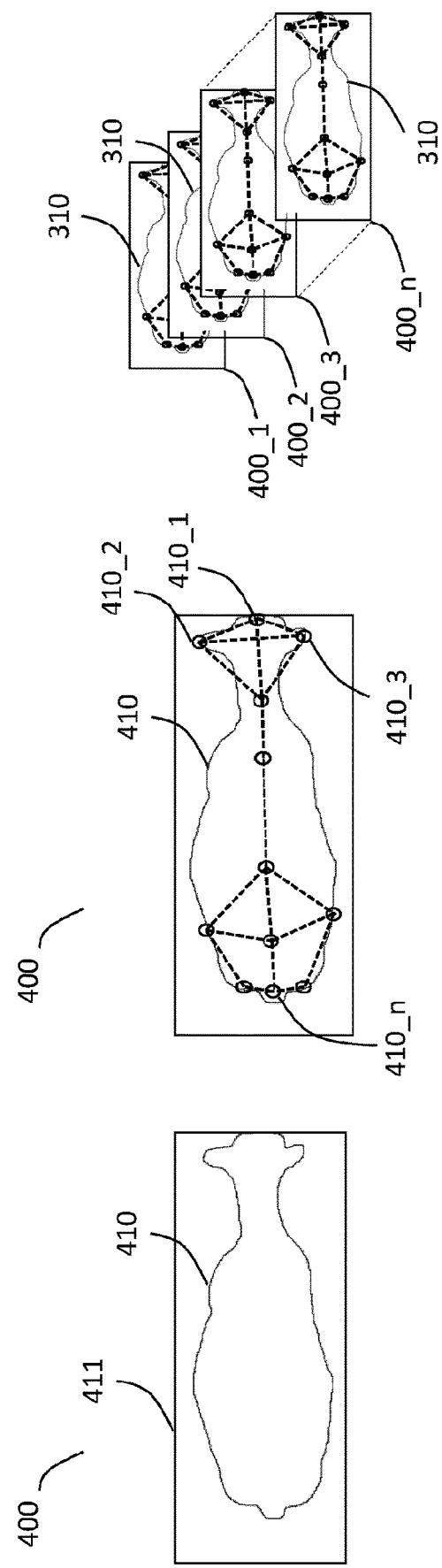

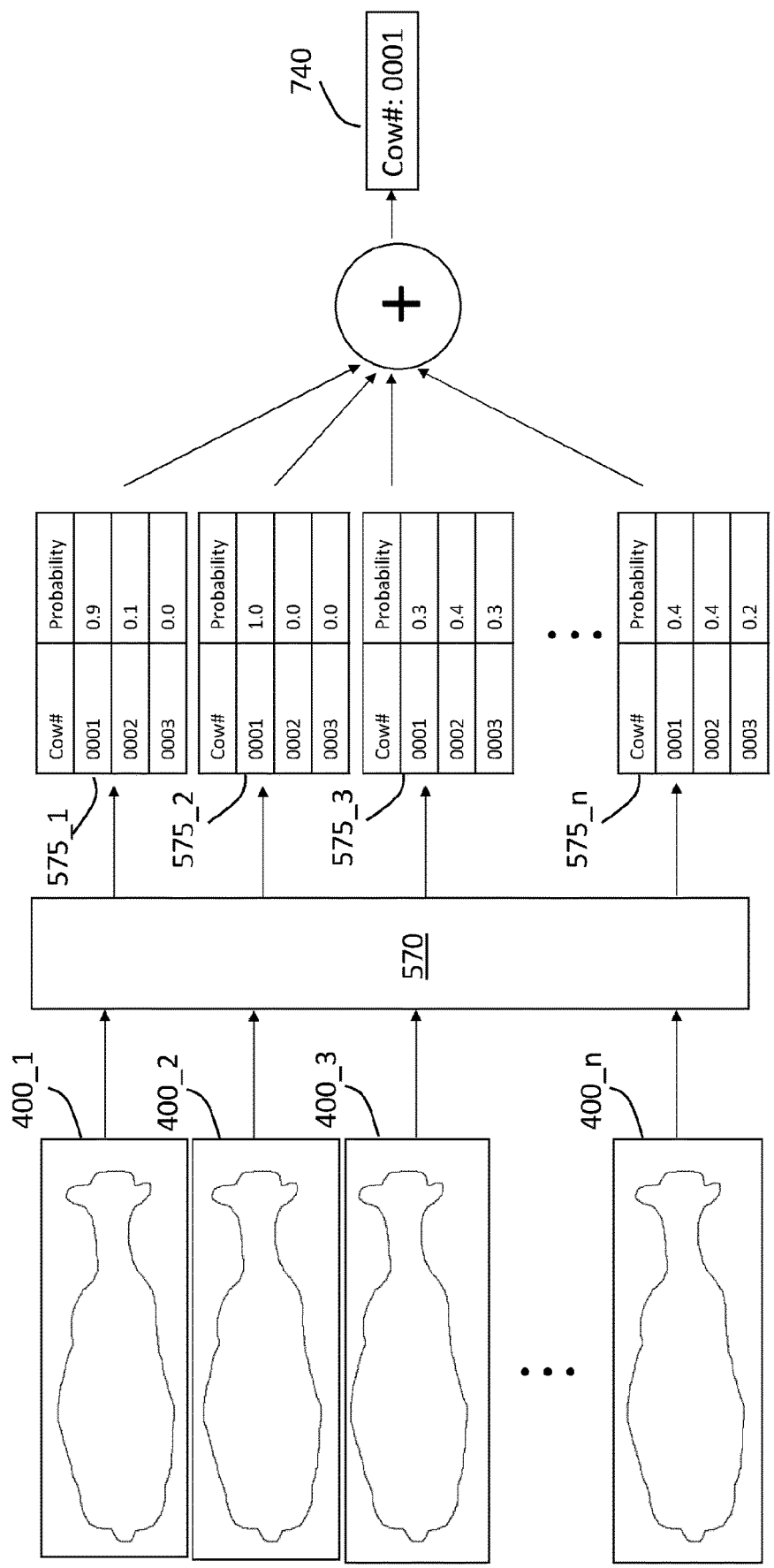

AUTONOMOUS LIVESTOCK MONITORING

CROSS-REFERENCE TO RELATED APPLICATIONS

This application is the U.S. National Stage of International Patent Application No. PCT/EP2021/051991, filed on Jan. 28, 2021, which claims the benefit of and priority to EP patent application No. 20183152.6, filed on Jun. 30, 2020, the contents of each of which are hereby incorporated by reference in their entireties.

FIELD

The present invention relates to a method and system for livestock monitoring. More specifically the present invention provides a system and method for monitoring the mobility levels and mobility behaviour of farm animals for assessing the health of individual animals in a population of animals

BACKGROUND OF THE INVENTION

Video analytics technology has seen rapid advances in recent years. Complex machine learning methodologies and algorithms are now becoming readily available. In addition, video capture technology has become ubiquitous with both stationary cameras and drones increasing in sophistication and decreasing in cost.

The availability of this technology has created an opportunity in the farming industry to harness the benefits of a deep learning-based video analytics platform to improve animal welfare standards. Better animal welfare standards not only increase on farm efficiencies but also address a consumer demand for confidence that the animals supplying their protein have experienced high welfare standards. Consequently, consumers demand greater standards from their suppliers specifically around the tracking and reduction of lameness/mobility levels.

Existing early lameness indication solutions rely either on human data capture or use of sensors positioned on the body of the animal. Sensor technology relies on manual intervention which by its nature is non-scalable, prone to inconsistencies and inaccuracies. Other solutions for monitoring the mobility levels of the animal rely on images obtained from specialised 3D camera equipment. The specialist cameras which form the basis of image-based solutions, are difficult to configure and maintain. For example, current solutions require custom configuration per environment, such as depth alignment, to ensure they function optimally, which needs to be maintained unchanged in order to ensure accurate results. Furthermore, existing solutions have a very restricted operative distance range and severe limitations to work outdoors or in poorly illuminated spaces.

Therefore, there is a need to provide a cost effective and efficient solution for monitoring animals that overcomes the drawbacks of the existing solutions.

SUMMARY

The present invention aims to provide a method and a system for monitoring mobility levels of farm animals that overcomes the problems of the known solutions.

Another aim of the present invention is to provide a system for the early diagnosis and control of mobility related issues affecting the health state and welfare of the animal such as lameness, mastitis, and the like.

Another aim of the present invention is to determine the flow of animals through a passage by tracking the movement and/or direction of the movement of the animals detected in the video recording.

A further aim of the present invention is to provide a method and a system for identifying an individual animal in a population of animals e.g. cows, pigs, and the like that can be integrated and used in a farm environment.

According to an aspect of the present invention, a method for monitoring mobility levels of an individual animal is provided.

The method comprising the steps of:
  obtaining a video recording of an animal moving through a space, the video recording captured by a two-dimensional imaging device from an overhead angle;
  extracting, from the video recording using an image processing device, a set of reference points, each reference point being associated with a body part location of the animal, wherein the step of extracting comprising:
  segmenting the video recording into a set of individual frames,
  detecting, in each frame, an instance representing the shape of the animal body;
  identifying, on the detected instance in each individual frame, the set of reference points, and
  extracting corresponding x and y coordinate values for each reference point, the x and y coordinate values being indicative of a position of each reference point in an individual frame; and
  determining, by means of a trained neural network, a mobility score for the animal based on at least the relative position of the reference points between individual frames, wherein the mobility score is indicative of the mobility level of the animal.

It has been found that the present invention is capable of monitoring animals without the need of specialised systems such as three-dimensional (3D) cameras and the like. The present solution is capable of monitoring an animal and derive its mobility levels based on video footage captured using a standard two-dimensional (2D) camera, such as video footage recorded using a security camera or similar. For example, a farmer may use a camera that may have been installed for security reasons or for monitoring animals and utilize the video footage obtained from such imaging systems over a period of time to determine a mobility score of an individual animal. For example, the video footage may be analysed to evaluate early detection of lameness in individual animals or other mobility related issues that may affect the welfare of the animal. The video footage showing the animal moving within a space may be obtained directly from the camera or other imaging equipment. For example, video footage may be obtained via live video streaming. The video footage may be also obtained from a video library stored in a storage module e.g. a cloud server. The video footage may be a segment of a longer master video recording. For example, a master video recording obtained over a period of time e.g. over 24 hours, may be divided into smaller video segments each showing at least one animal moving through a space e.g. through a walkway, passage, feeding/milking station, and the like. For the example, the video recording may show animals entering and exiting a passage in a farm environment. Furthermore, each video recording may be associated with an individual animal. For example, the master video recording may be processed to detect animals moving in a given direction under the video recording equipment, and for each animal detected generate a corresponding video recording.

The solution of the present invention is advantageous in that it offers an autonomous livestock monitoring system and method that may be integrated with existing imaging systems such as, for example, security monitoring systems within the farm environment in which the animals are kept. The video footage captured by the camera system may be transmitted via a communication link to a livestock monitoring software platform for processing and analysis. As previously described, the video footage may be obtained directly from the camera or from a repository e.g. a cloud server. The software application platform may be running on a server e.g. a remote or locally installed application server, and may be configured to determine, based on the processing and/or analysis of the video footage, the mobility levels of individual animals and accordingly associate each animal with a mobility score indicative of its mobility levels. The results of the analysis may be transmitted to an electronic device running a software application allowing an end user to view and manage the data obtained from the livestock monitoring software application. The livestock monitoring platform may determine the mobility levels of each detected animal by analysing the movement and/or position of specific body parts during the video recording, e.g. head movement, spine curvature, pin bones position, ears movement, tailbone, and the like. The movement or position of the specific body parts may be detected by segmenting the video recording into a set of individual frames and monitoring the relative position of a set of reference points associated with the specific body parts of the animal between the frames. The relative position of the reference points may be determined by extracting the x and y coordinate of each reference point on an instance of the animal detected in each video frame. Based on the movement of each reference point or group of reference points in the video recording a mobility score may be calculated indicative of the mobility level of the animal. For example, an abnormal gait or stance of an animal may result in a mobility score indicative of a dysfunction of the locomotor system of the animal, such as lameness or other mobility related issues. According to embodiments of the present invention, an end user may share an internet protocol, IP, address of an existing camera used in a farm environment for security and/or animal observation purposes so that live video footage may be analysed and processed by the livestock monitoring platform. The video recording may be segmented into a set of individual frames. The number of individual frames in the set depends on the equipment used to capture the video recording. For example, a video recording of two seconds captured with a 2D camera capable of capturing twenty frames/second (fps) would result in a set of forty individual frames. The livestock monitoring software application may detect in each frame an instance representing the shape of the animal's body and accordingly locate a set of reference points on each detected instance. Each reference point may be positioned on a location on the detected instance associated with a specific body part. The livestock monitoring software application may extract the position of each reference point in each individual frame, by calculating the x and y coordinate values. By knowing the position of the reference points in each individual frame, the livestock monitoring software platform determines the relative movement in the position of each reference points between frames. The degree of movement of each reference point or group of reference points across the set of frames may be used by a trained algorithm to determine a mobility score indicative of the mobility levels of the animal in the video recording. Accordingly, a set of notifications may be transmitted to the end user device on the mobility levels of each animal detected in the video recording or video recordings. For example, the software application platform may generate, based on the information obtained from the video footage, a report with animals detected and their corresponding mobility scores, notifications to the farmer or other users for urgent matter, and the like.

As such, the present invention may enable autonomous monitoring and extraction of insights on the health and welfare state of the animals. For example, the present solution may determine welfare indicators of the animal based on observation made on how the animal walks in the video recordings.

According to embodiments of the present invention, the detection of an instance of an animal in each frame may be performed by means of an object detection algorithm. A bounding box may be placed around each detected instance of an animal in each video frame.

According to embodiments of the present invention, the step of detecting an instance comprising:
  generating a bounding box around each detected instance of the animal body in each frame; and
  tracking, based on the bounding boxes generated, the movement of the animal across the individual frames to determine whether the movement of the animal though the space was continuous or interrupted;
  wherein, when the movement of the animal is detected as being continuous, then the method continues to the step of identifying the reference points in each detected instance, otherwise the analysis continues to the next animal detected in the video recording.

Preferably, the mobility level analysis of an animal may be performed on video recordings showing animals moving freely, and continuously through the space. For example, prior to detecting the reference points and extracting the corresponding x and y coordinate values, the continuous movement of the animal through the designated space may be verified. For example, a flow detection system may be provided to detect whether the movement of the animal through the space was continuous or impeded during the video recording. In general, the natural movement of animals through the space may be interfered by obstacles such as other animals, which may lead to skewed mobility results. In order to improve the accuracy of the detection of mobility levels, analysis may be only conducted on intervals showing the animal moving freely through the passage. Preferably video recording intervals showing an animal in close proximity to other animal, which may impede its movement, or showing that the animal has stopped entirely, due to an animal in front or some other obstacle, may be disregarded from the mobility level analysis. The determination with regards to the continuous movement of the animal may be obtained by analysing the bounding boxes produced by the segmentation algorithm. If no sufficient intervals of free movement can be extracted, the mobility levels of the animal are not analysed and the process continues to the next animal detected in the video recording. The use of a flow detection system may be advantageous in that the mobility level analysis is selectively performed on video recording showing the animal moving freely through the passage.

According to embodiments of the present invention, the step of extracting the x and y coordinate values comprising:
  generating at least a first array and a second array for each individual frame, the first array comprising the x coordinate values of the reference points in each individual frame, and the second array comprising the y coordinate values of the reference points in each individual frame; and combining the values in the first and second arrays to create a third multi-dimensional array of x and y coordinate values having a size defined by the number of individual frames and the number of reference points.

The present invention utilises video recording of animals to detect their motility levels based on their movement. As the animal moves, variances in the movement of anatomical features of the animal body may be monitored by obtaining x and y coordinates of corresponding reference points. For example, each reference point may be associated with a location on the body of the animal, e.g. anatomical features of the back of the animal, the head, the neck, spine, the pin bones, the ears, or another body part. By monitoring the animal over a number of frames for a duration of time from the obtained recording, the x and y coordinate values may be obtained for each of the identified reference points to provide a data set for further analysis of the animal. The number of frames largely depend on the imaging device. For example, the imaging device may be configured to output twenty frames per second. Therefore, the animals, in this particular example, may be monitored over a sufficient number of frames to detect its movement. For example, the video recording for each animal may be two seconds, resulting in a data set of forty frames, for a camera with a frame rate of twenty frames per second. The size of the data set may be determined by the number reference points in each corresponding frame and the coordinates for each reference point. The software application platform may extract for each frame a corresponding first array, indicating the "x" coordinate values for the reference points in a single frame, and a corresponding second array, indicating the "y" coordinate values for the reference points in a single frame. The x coordinate values may indicate the position of a reference point along a horizontal axis, while the y coordinate may indicate the position of the reference point along a vertical axis. The first and second arrays generated for each frame may be represented into corresponding first and second matrices. The first and second matrices may be in a row and column format, whereby each row may represent the corresponding x and/or y values for an individual frame, while each column may indicate the corresponding x and/or y coordinate values for a particular reference point in each frame. The first and second array, or first and second matrices, may be combined into a multi-dimensional third array, which may be in the form of a data cube. The size of the multi-dimensional third array may be determined by the number of frames, the number of reference points, and the number of coordinate values e.g. 40 (frames)×2 (x and y coordinate values)×12 (number of reference points). According to embodiments of the present invention, the step of determining the mobility score of the animal comprises processing the third multi-dimensional array by means of a convolutional neural network to classify the movement of the body part locations of the animal across the set of individual frames. For example, the third array may be processed by a trained convolutional neural network, or another type of neural network, configured to calculate a mobility score of the animal based on variances identified in the x and/or y coordinate values of at least some of the reference points across the set of individual frames and/or relationship between the x and y coordinates values of each reference point. For example, the speed or direction of the animal may be detected based on monitoring the x coordinate values of at least one reference point between the frames. By extracting the x and y coordinate data set for the reference points in each frame, deep learning algorithms may be employed for processing the images to determine the mobility levels of an animal. For example, images of the animal from the frames may be processed to assign importance to various aspects/objects of the reference points extracted. For example, the convolutional neural network may determine the mobility levels of an animal based on variances on the x and y coordinate values of each reference point and/or a relationship between the x and y coordinate values of the reference points across the individual frames obtained from the video recording. For example, the convolutional neural network system may be trained on the movement of the reference points such as, but not limited to, their absolute positions and positions relative to each other, as the animal moves.

According to embodiments of the present invention, wherein the step of identifying the reference points on the body of the animal comprises applying a pre-calculated segmentation mask on an instance of the animal detected in each individual frame. The present solution is capable of allocating the set of reference points to the body of each animal, from the video recording captured by the overhead camera. The detected reference points may then be associated with a specific instance of each animal in each individual frame through the use of a pre-calculated segmentation mask. In this way, the segmentation mask may be used to track the movement of the animals in the video recording. The segmentation mask may cover a pixel area associated with the body of the animal. As such, the spatial location of each pixel may be considered as corresponding to a particular location on the body of the animal. In this way, the x and y coordinate values of each reference point may be extracted based on the spatial location of pixels both in the segmentation mask and relative to the individual frame. The x and y coordinate values may be calculated from an edge of the individual frame. As such, observing the x and y coordinate values of each detected reference point in each individual frame allows for variances in the body movement of the animal to be monitored as the animal moves over a period of time. The instance segmentation may combine object detection with an aim to classify individual objects and localize them using a bounding box, and instance segmentation, with an aim to classify each pixel into the given classes.

According to embodiments of the present invention, the set of individual frames comprising at least twenty-five frames, preferably forty frames or more. Configuration changes may be possible by modifying the number of frames per second from the recording, such changes may be dependent on the capabilities of the imaging device employed to obtain a video recording of the animal. In other words, it is possible to segment a video recording, for example, over a two second interval at twenty frames per second (fps) to obtain forty frames from which the relative position of the set of reference points within each of the frames may be extracted. In this way, the number of frames may be chosen so as to provide a minimum duration of time that provides enough information of the animal as it passes through a walkway. For example, utilizing twenty frames of footage from a video recording obtained using an imaging device configured to operate at twenty frames per second, would provide one second of motion of the animal observed as it passes through the walkway.

Monitoring the mobility level of the animal(s) may also comprise measuring a speed of the animal by monitoring differences in the x-coordinate values of the reference points across the set of individual frames obtained. For example, the mobility of the animal(s) may also comprise measuring spinal curvature of the animal by monitoring the degree of curvature of the reference points associated with the spine. Using at least twelve reference points ensures processing efficiency while minimising the number of data/information that needs to be processed by the image processing device and thus improving the ability to identify mobility issues of the animals such as lameness. It should be noted that determining the mobility levels of the animal may involve the calculation of other parameters such as pin bones movement, the movement of the animal in relation to other animals and the like. Furthermore, other external parameters may be taken into account to determine the mobility level of the animal from a video recording such as the dimensions of the passage that the animals walk through, or their proximity to other animals during movement. For example, a narrow passage may restrict how fast the animal may move through it. Similarly, if there is a traffic congestion due to the number of animals moving through the passage, then the movement of the animal may be restricted. The number of reference points may vary depending on the parameters to be extracted from the animal. For example, a higher number of reference points may be used to monitor more locations on the animal body. As such, the present invention offers a resource efficient, adaptable, and configurable solution for determining the mobility levels of an animal.

According to embodiments of the present invention, wherein the step of determining the mobility score of the animal comprising:
performing, by means of a convolutional neural network, successive convolution and pooling iterations on the x and y coordinate values of the extracted set of reference points corresponding to each individual frame;
performing, by means of a convolutional neural network, an average pooling of the output from the successive convolution and pooling iterations;
performing a linear activation of the output from the average pooling operation; and
generating a mobility score indicating the mobility level of the animal.

The initial filtering and max pooling performed by the successive convolution and pooling iterations may passed along a temporal axis of the third array to determine the movement between reference points in each frame. The temporal axis may be indicative of movement between reference points across the third array input matrix e.g. movement from the head to the ear to the tail and so on. A final filtering process may be applied along the feature's axis, wherein the feature's axis is indicative of movement of reference points between frames i.e. down the third array matrix, moving from the first frame to the second, and then to the third, and so on The final results may be passed to a final fully connected layer with linear activation within the image processing device, as it is the practise in standard convolutional neural networks known in the art. The final result of the analysis may be a floating-point number between 0.0 and 100.0, indicating the degree of lameness in relation to changes observed between reference points in each frame and changes observed between frames. For example, a score of 0.0 may indicate a good level of mobility whilst a score of 100.0 would indicate a very poor level of mobility and therefore a high likelihood of lameness in the animal. The mobility score generated may then be translated to a value in a standardized scoring system such as the scoring system developed by the agricultural and horticultural development board, AHDB, in the United Kingdom.

According to embodiments of the present invention, the imaging device used to capture the video recording is a two dimensional, 2D, camera. In this way, the present invention may be implemented using of the shelf cameras to determine the mobility score of an animal. For example, a 2D camera operating at 20 frames/second may be used. Therefore, the present solution does not require specialised equipment as it is the case with existing solutions, and thus is cost effective Furthermore, by enabling the utilization of 2D cameras as in the present invention, such as off the shelf 2D cameras, avoids the need for bespoke hardware cameras and configurations such as, for example, 3D imaging systems. The 2D camera may be mounted on a fixed overhead location or may be mounted on a movable object e.g. a drone.

According to embodiments of the present invention, the method comprises an enrolling step to assign a unique ID to each individual animal from a plurality of animals. The enrolling step comprising detecting each animal of the plurality of animals based on the video recording; and assigning a unique identification, UID, to each detected animal of the plurality of animals in the video recording.

During the enrolling phase, a video recording may be captured for each animal by a 2D camera. Each video recording may be segmented into a set of individual frames, and an instance of the animal may be detected in each frame. A segmentation mask may be applied to each detected instance of the animal in each frame and accordingly the reference points and their corresponding positions in each frame may be detected. During the enrolment phase, detected instances and corresponding reference point positions of the animal may be assigned an arbitrary unique identification (ID). The arbitrary unique ID of each enrolled animal may be associated with the actual ID of the animal obtained from a separate source e.g. an RFID tag, marking and the like. As such the detected instances in a video recording and corresponding position of the reference points for each enrolled animal are associated with the actual ID of the animal.

The enrolling phase provisions a means for ensuring that the mobility score determined for each animal is allocated to the correct animal thereby avoiding misidentification. For example, a farm may have hundreds of cows and therefore measuring the mobility score of each of these cows requires multiple stages of analyses before the score is determined. To avoid misidentification and allocation of the mobility score of an animal, the identity of each animal may be detected to ensure correct allocation of the mobility score. The enrolling phase may be skipped. For example, a farmer may not be interested in identifying the mobility score of an individual animal but may be interested in the overall mobility score of the herd. In this situation, the enrolling step may not be required as the mobility score would be associated with the herd of animals and not with the individual animals.

According to embodiments of the present invention, assigning the arbitrary UID to each detected animal comprises processing the video recording using an object detection algorithm configured to at least create a bounding box for each instance of the animal detected in each frame obtained from the video. In this way, errors through manual assignment of identification to an animal is thus avoided through the utilization of the object detection algorithm. Furthermore, utilizing object detection algorithms may enable quicker identification than using a manual means and therefore reduce measurement times, for example, for determining mobility score for a plurality of animals within, for example but not limited to, a farmyard. The system may provision a means wherein each video frame from the set of individual frames is passed into an object detection algorithm to detect an instance of the animal body shape. For example, such object detection algorithm may be previously trained for the detection of animal in video frames obtained from a video recording. The object detection algorithm may create a bounding box around the instance of the animal detected in each video frame. The object detection algorithm may provision further means for creating a segmentation mask for each animal e.g. cow, in the frame that is overlaid on the detected instance of the animal in each frame. The use of the segmentation mask may improve the performance of the identification by filtering out background features not related to the animal. Accordingly, as previously discussed, the corresponding position the reference points in each frame may be extracted. The bounding boxes obtained from the instances of the detected animal in the set of individual frames may be passed to an object tracking algorithm. The object tracking algorithm may select from the set of video frames a set of bounding boxes for each animal, which are grouped together, and accordingly assigned an arbitrary, unique ID which is associated with an individual animal in the video recording. For example, the set of bounding boxes may comprise any number of desired bounding boxes e.g. at least one, ten or more bounding boxes extracted from corresponding number of video frames. A higher number of bounding boxes may be used to improve accuracy of the animal identification. The animal instances detected as above are then sorted in the order they appeared in the video footage and synced up with the actual animal IDs as recorded earlier e.g. from an RFID tag. For example, a RFID reader may be positioned at a location on the passage that would capture the ID information from an RFID tag attached to the body of each animal. The order in which the animal appear on the video footage may be associated with the order in which the ID of each animal was captured by the RFID reader. The synced-up IDs may be used as training labels in conjunction with the images extracted from the bounding boxes of each animal in the video recording as above to train an ID classification network. The ID classification network may be a convolutional neural network such as ResNet-50, ResNet-101, ResNet-152, or similar. Once the ID classification network has been trained, new video footage may be processed as per earlier steps above to detect an individual animal from the plurality of animals. For example, the identification of an animal may involve;

segmenting a video recording of the animal into a set of frame,
detecting in each video frame an instance/image of the animal body,
generating a bounding box around the animal instance in each video frame using the object detection algorithm;
passing the bounding boxes generated for each animal from the video frames through the ID classification network to produce an array of identification probabilities for each of the possible animals that the network was trained on. The ID probabilities may then be averaged over the ten bounding boxes generated from the corresponding video frames to generate a probability array for the detected animal in the video recording. Based on the probabilities generated, the ID of an enrolled animal with the highest matching probability is assigned to the detected animal in the video recording. For example, the probabilities for each animal detected in the video recording may be post-processed in order to assign the most likely ID to an animal based on the probabilities for all other animals detected in the video recording. This post-processing allows the system to prevent duplication of IDs and also enable checking for animal IDs with a very low probability which likely have not been enrolled. The trained ID classification network may take a range of parameters into account in order to generate the corresponding probabilities such as the number of pixels in the images, the number and type of curves of the animal shape detected, patterns or shapes on the animal, bone structure, or any other known parameter. The trained ID classification network may be trained using a set of animal video recording.

According to embodiments of the present invention, the present solution may be used to monitor the mobility levels of cows or other animals. The cows may be Holstein cows or another breed.

According to embodiments of the present invention, the step of determining a mobility score comprises assigning the mobility score to an animal identified in an enrolment step. The animal identification step may comprise:
processing the instances of the detected animal in each video frame;
creating a bounding box and a corresponding segmentation mask for each instance of the detected animal;
extracting a number of images from selected bounding boxes;
processing each image through a trained ID classification network configured to assigning an ID matching probability for each unique ID of an enrolled animal;
averaging the ID matching probabilities generated for each image; and
assigning to the animal detected in the video recording the ID of an enrolled animal with the highest probability.

In this way, the mobility score can be associated with the animal identified and therefore provide a score for comparison in future determinations of mobility score for said animal in order to determine, if any, changes in the animal mobility occur. Furthermore, assignment of the score to the animal may enable a determination of the average mobility score of a herd based on the assignment to each identified animal within the herd.

According to a second aspect of the present invention, a system for determining a mobility score of an animal is provided. The system comprising:
means for obtaining a video recording of an animal moving through a space, the video recording captured by a two-dimensional imaging device from an overhead angle;
an animal detection system configured for determining a mobility score associated with the mobility level of the animal;
a user device communicatively coupled to the animal detection system and configured to receive information associated with the mobility score of the animal;
wherein the animal detection system comprising:
at least one processor configured to perform the method according to the first aspect of the present invention.

In this way, there is provided a means for monitoring the mobility levels of the animals in an autonomous manner that requires little or no human intervention. As a result, alleviating the need for having a trained person, such as for example a vet or farmer, to be physically present within the locality of the animal(s) to perform such tasks whilst also saving the costs and time involved in performing the tasks.

According to a third aspect of the present invention, an animal farm comprising the system according to the second aspect is provided. The system of the present invention may be installed at any location on the farm. For example, the system may be installed at a walkway and/or a passage where the animal pass to move to another area of the farm e.g. a walkway between the feeding and the milking station. The passage may be dimensioned so as to allow a number of animals to move in a predetermined direction. The passage may for example be configured to accommodate animals moving one after another or side by side in a single or multiple lines. The passage may be further separated into multiple sections, each section configured to accommodate a number of animals moving one after another or side by side in a single or multiple line. According to a fourth aspect of the present invention, the present invention may be used for detecting lameness in an animal or another mobility affecting issues.

BRIEF DESCRIPTION OF THE DRAWINGS

The present application will now be described with reference to the accompanying drawings in which:

FIG. 4a illustrates an example of a segmented image of an animal from a video recording received from an imaging device, said animal surrounded by a bounding box, according to embodiments of the present invention.

FIG. 4b illustrates an exemplified arrangement for identifying, in the segmented image of the animal, reference points associated with body parts of the animal according to embodiments of the present invention.

FIG. 4c illustrates an example of collecting segmented images of an animal according to embodiments of the present invention.

FIG. 9 shows an example of how an individual animal may be identified according to embodiments of the present invention.

DETAILED DESCRIPTION OF THE DRAWINGS

The present invention will be illustrated using the exemplified embodiments shown in FIGS. 1 to 12. While this invention has been shown and described with reference to certain illustrated embodiments thereof, it will be understood by those skilled in the art that various changes in form and details may be made therein without departing from the scope of the invention encompassed by the appended embodiments.

Figure 1:
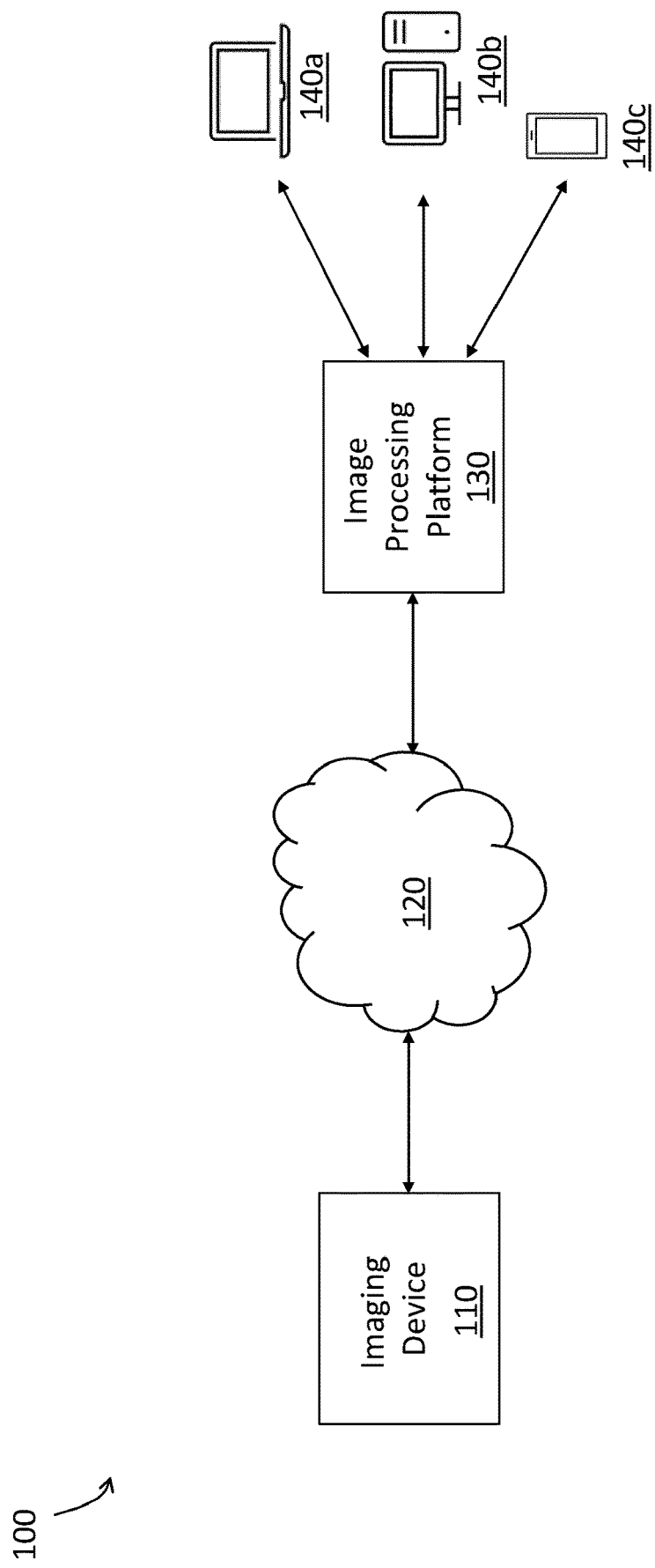
FIG. 1 shows an exemplified arrangement for determining a mobility score of an animal according to embodiments of the present invention.

FIG. 1 shows an example of a system 100 for monitoring the mobility levels an animal and determining a corresponding mobility score, according to embodiments of the present invention. The system 100 may be provided with at least one imaging device 110. The imaging device may be configured to record an animal or may be configured to take images of the animal as an animal moves within the view of the imaging device. The imaging device may be positioned such that the imaging device is located at an overhead angle relative to the animal passing below the imaging device. The imaging device may be a camera device for obtaining images of the animal for example a two-dimensional (2D) camera.

The imaging device 110 may be communicatively coupled to a communication link 120. The imaging device may be communicatively coupled to the communication link 120 by a wired or wireless connection.

The video recording of the animals obtained from the imaging device may be stored in a database in a local or remote computer server. The database may be in any suitable form such as a relational database such as an SQL database, or fixed content storage system, used to store video recording or any other configuration or administration information required to implement the cloud service. The imaging device 110 may further be configured to transmit live video footage of the animals being observed via a wired or wireless communication network to an image processing platform 130 for further processing and analysis. For example, the video footage may be retrieved directly from the imaging device by the image processing platform 130 for processing and analysis over the communication link 120 or may be retrieved from the database for processing and analysis. The software application platform may be running on a server e.g. a remote or local computer application server, and may be configured to determine, based on the processing and/or analysis of the video footage, the mobility levels of individual animals and accordingly associate each animal with a mobility score indicative of its health state.

The results of the analysis may be transmitted, by wired or wireless communication means, to a user electronic device 140a-140c running a software application allowing an end user to view and manage the data obtained from the livestock monitoring software platform 130. For example, an end user may share an internet protocol, IP, address of an existing camera imaging device used in a farm environment for security and/or animal observation purposes so that live video footage can be analysed and processed by the livestock monitoring software platform. The system may provide the ability to autonomously extract insights of the state of the animal including mobility scores and may be further used to identify the animal(s).

For example, the present invention may determine welfare indicators of the animal based on observation made on how the animal walks. These insights may be delivered to, for example, an end user 140a-140c in a notification and optionally in an actionable format e.g. a list of animals that can be printed or emailed to a vet, or a text to the farmer for urgent alerts. For example, a farmer may receive notifications regarding the state of monitored animals on the computer software application running on his/her electronic device, and accordingly could initiate certain actions such as, for example, contacting a vet to attend to the animal(s) having mobility issues.

The present invention may also be used for determining the mobility levels/mobility score for a herd of animals. For example, a farmer may be interested in the overall health of his/her herd. The present invention may determine welfare indicators of individual animals or may determine welfare indicators of the herd. In this way, a farmer may receive notifications regarding the state of the monitored herd on the computer software application running on his/her device 140a-140c and accordingly could initiate certain actions to address potential issues with the health e.g. mobility of his/her herd.

Figure 2A:
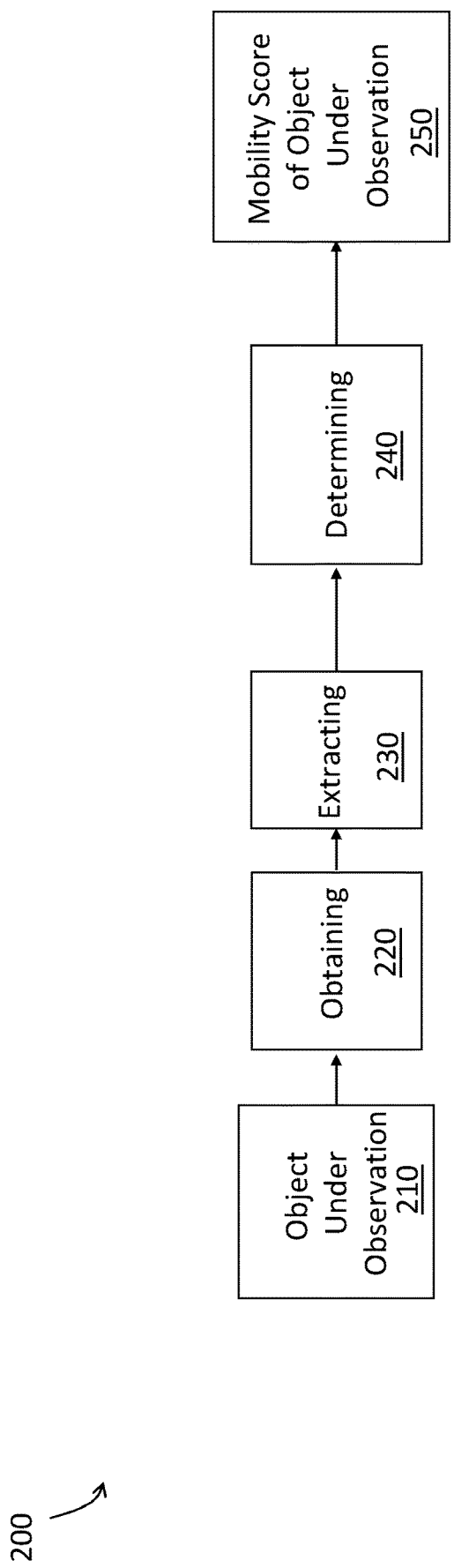
FIG. 2a is an exemplified process flow for determining a mobility score of an animal according to embodiments of the present invention.

FIG. 2a shows an exemplary embodiment of a method 200 for determining a mobility score for individual animals according to embodiments of the present invention. By way of illustration, a number of animals may be observed at step 210. A video recording video of the animals, by means of an imaging device, may be obtained at step 220, for example, as the animals passes through a walkway. The imaging device 110 may be a 2D camera positioned at an overhead location along the walkway thereby obtaining a video recording, or video footage, of the animals from an overhead angle as they pass along the walkway. Extracting, at step 230, the x and y coordinate values of a set of reference points associated with locations on an instance of the animal body detected in each video recording. During the extraction step, the video recording may be separated into individual frames, each animal present in each frame is detected, and the individual frames for each animals are grouped together, so as to calculate for each animal the x and y coordinates of the reference points across the individual set of frames. The x and y coordinate values thus represent the position of the reference points in each frame. For each animal detected in the video recording a mobility score may be calculated, based on the relative position of the corresponding set of reference points across the individual frames, at step 240. The mobility score may be associated with the animal under observation at step 250. The mobility score may further be calculated based on historical data for each animal detected. For example, each animal detected in the video recording may be identified, based on a unique ID assigned during an enrolment phase, as it is described in the paragraphs below with reference to FIGS. 6 to 10.

Figure 2B:
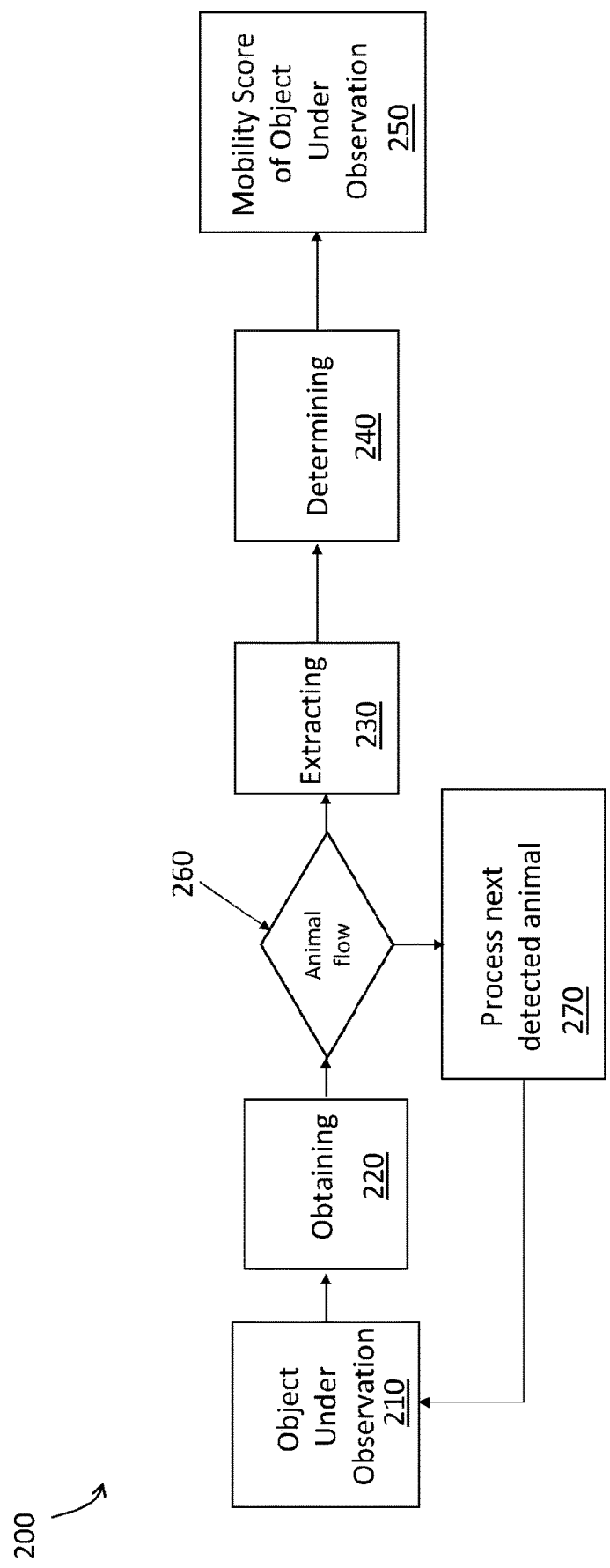
FIG. 2b is an exemplified process flow for determining a mobility score for an animal as in FIG. 2a and includes an additional animal flow detection step according to embodiments of the present invention.

Optionally, prior to extracting the reference points and corresponding x and y coordinate values at step 230, the continuous movement of the animal through the designated space may be verified, at step 260 as shown in FIG. 2b. For example, a flow detection system may be provided to detect whether the movement of the animal through the space was continuous or impeded during the video recording. In general, the natural movement of animals through the space may be interfered by obstacles such as other animals, which may lead to skewed mobility results. In order to improve the accuracy of the detection of mobility levels, analysis may be only conducted on intervals showing the animal moving freely through the passage. Preferably video recording intervals showing an animal in close proximity to other animal, which may impede its movement, or showing that the animal has stopped entirely, due to an animal in front or some other obstacle, may be disregarded from the mobility level analysis. The determination with regards to the continuous movement of the animal may be obtained by analysing the bounding boxes produced by the segmentation algorithm. If no sufficient intervals of free movement can be extracted, the animal is not analysed. The use of a flow detection system may be advantageous in that the mobility level analysis is selectively performed on video recording showing the animal moving freely through the passage. In the case, where the flow detection system determined at step 260 that the movement of the animal was interrupted, then the interval showing the detected animal is disregarded from the analysis, and the process moves to the next animal at step 270.

Figure 3:
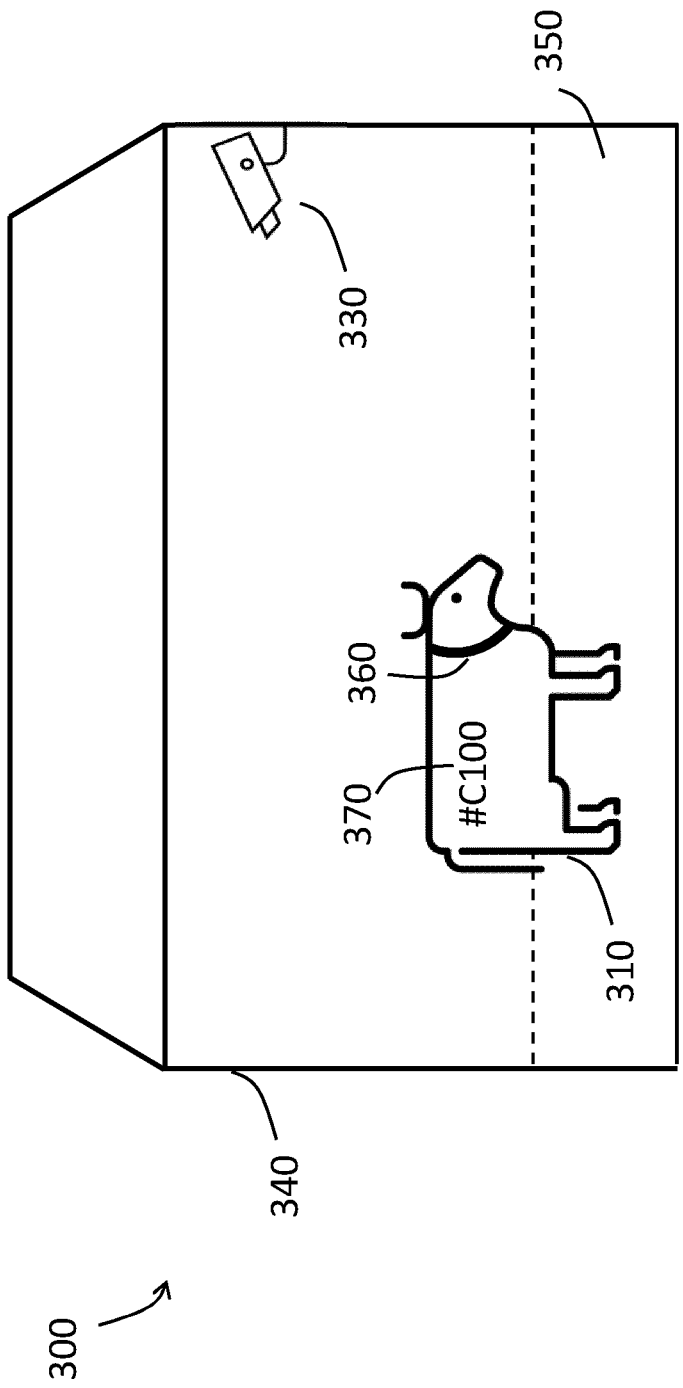
FIG. 3 shows an exemplary arrangement for obtaining images of an animal according to embodiments of the present invention.

FIG. 3 shows an exemplary arrangement 300 for capturing a video recording of an animal 310 such as a cow, a pig, a horse, and the like. In this arrangement, a 2D camera 330 mounted at an overhead location in a building 340 of a farm environment may be used for capturing the video recording. The 2D camera may be an existing camera used for other purposes, such as security and/or animal observation within the farm environment. For example, the camera may be installed in an overhead location of a walkway 350, e.g. a walkway used by animals to move between different farm stations. Once video footage has been obtained, the image processing device may extract, from the video recording, a set of reference points associated with specific locations on the body of the animal. The extracting may comprise the steps of segmenting the video recording into a set of individual frames/images. In each of the individual frames, an instance of the animal 310 may be detected for example by means of an object detection algorithm, A bounding box may be placed around each detected animal instance. Based on the detected instance the set of reference points may be identified on the detected instance. The x and y coordinate values of each reference point in each individual frame may be accordingly extracted to determine the position of each reference point and consequently the movement of each corresponding body part, across the set of individual frames. The image processing platform 130, based on the x, y, or x and y coordinate values of the extracted set of reference points corresponding to each individual frame may determine a mobility score, which is indicative of the mobility levels of the animal.

Figure 6:
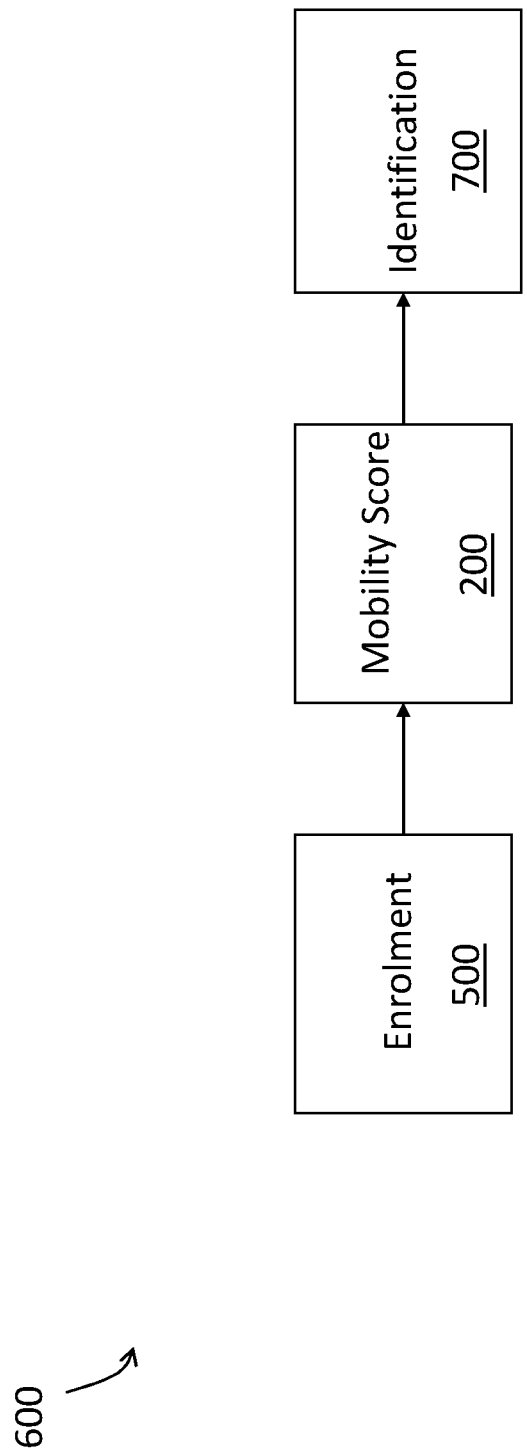
FIG. 6 shows an exemplified process flow for identifying individual animal during an enrolment phase according to embodiments of the present invention.

FIG. 4a illustrates an example of a segmented image 400 obtained during the extraction step 230 from the video recording. A shown, an instance of the animal body 410 is detected in the segmented image 400, according to embodiments of the present invention. The animal instance 410 may be detected by an object detection algorithm which creates a bounding box 411 around the detected instance 410, in a similar manner to the one discussed below with reference to the enrolment phase, as shown in FIG. 6. FIG. 4b illustrates the set of reference points 410_1 to 410_n identified on the detected instance 410 of the segmented image 400 of the animal according to embodiments of the present invention. In the example illustrated in FIG. 4b, twelve reference points, shown by the circular shapes, are identified along the body of the animal from the head to the tailhead. FIG. 4c illustrates the set of segmented images 400_1 to 400_n of the animal 310 with the identified reference points.

Figure 5B:
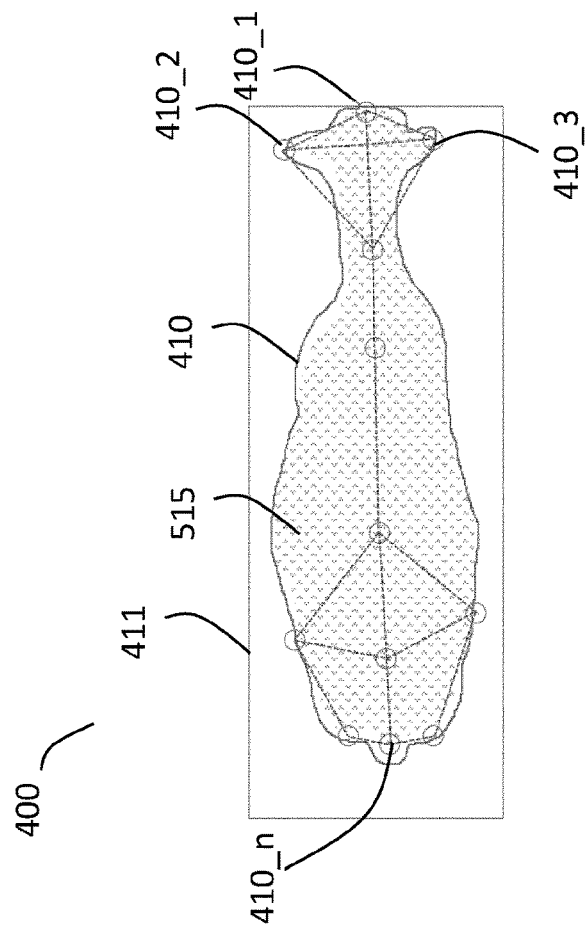
FIG. 5b illustrates an example of a segmented image of a detected animal surrounded by a bounding box with a segmentation mask overlaid on the animal and references points associated with body parts of the animal according to embodiments of the present invention.
Figure 5A:
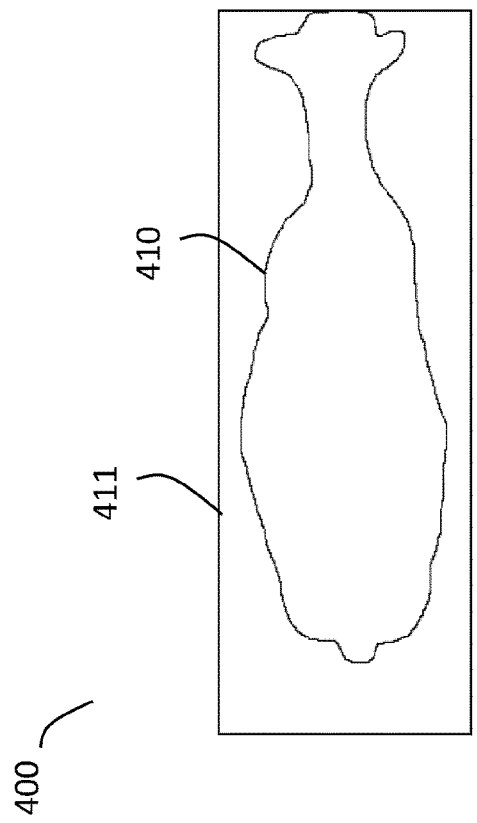
FIG. 5a illustrates an example of a segmented image of a detected animal surrounded by a bounding box according to embodiments of the present invention.

In a further exemplified arrangement, a process for determining the reference points on locations of the animal instance may comprise the following:
  i) providing data input, for example a number of video recording obtained from animals in different farms, to train an algorithm used to determine the reference points on the animal instance. For example, a data set of three hundred video recordings of animals moving through a predetermined space may be provided for training a standard ID classification network of the system to identify reference points on the body of an animal. For example; the ID classification network may be a neural network, such as a ResNet50, or ResNet101, or another type of a convolutional neural network, CNN, architecture. At the training stage, each reference point may be manually labelled. Furthermore, the classification network may be trained on historical video recordings from the same animal, in order to cope with animals that have a naturally abnormal locomotion. As a result, avoiding the case of false positives.
  ii) providing means for detecting the reference points. For example, the detection of the reference points may be performed using the trained ID classification network of step i). A standard classification layer within the convolutional neural network may be replaced by deconvolution layers so as to scale feature maps of the animal into heatmaps representing areas of likelihood for each reference point via training on the data from step i)
  iii) extracting x and y coordinate values for each reference point in each frame. The reference points x and y coordinates values may be taken as the areas of highest magnitude from the heatmaps produced in step ii). These reference points may then be associated with a specific instance of each animal through the use of a pre-calculated segmentation mask. Illustrated in FIGS. 5a and 5b are an example arrangement of information that may be processed by the image processing platform 130 to detect the instance of the animal 410 in an individual frame 400. The pre-calculated segmentation mask 515, as discussed above, may then be utilized so as to associate the position of the reference points 410_1, 410_2, 410_3 . . . 410_n with an individual animal 410.

FIG. 6 shows an example method 600 for the identification of the animal(s) comprising an enrolment step 500 for enrolling the animal(s) into the system, a mobility score step for determining the mobility score of the animal(s) such as via the exemplary method 200 previously described and an identification step 700 for identifying individual animals according to embodiments of the present application. In the arrangement shown, the enrolment step 500 may be adapted to allow the animal to be enrolled onto the system through preparation of a labelled dataset of the animal(s) thereby ensuring that the mobility score determined for each animal is allocated to the correct animal thereby avoiding misidentification.

Figure 7:
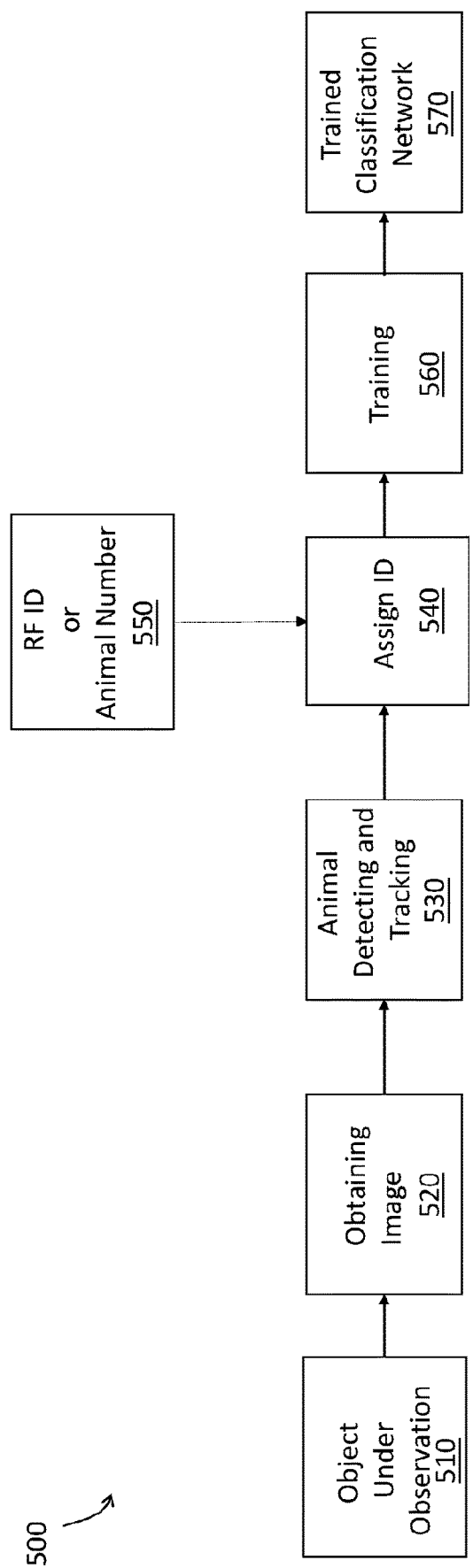
FIG. 7 shows an exemplified process flow for training an ID classification network with data obtained during an enrolment phase according to embodiments of the present invention.

FIG. 7 shows an example process flow 500 for enrolling the animal. For example, and with reference to FIG. 3 discussed above, during the enrolment step, the animal(s) under observation 510, 210 may walk along the walkway 350 under an imaging device 110, 330 such as, for example, a security monitoring system within a building 340 in a farm environment in which the animals are kept, and a video of the animal(s) may be obtained 520 from the imaging device 110, 330. An additional source (not shown) may be used to obtain the actual identity the animal(s). For example, the actual identify of the animal may be identified by means of a radio frequency identification, RFID, tag 360 attached to the body of the animal or by a number marking on the body of the animal 370 for example. Information associated with the animal(s) identified may be obtained by the additional source, and the information retrieved may be recorded in the order in which the animal(s) passed under the camera 110, 330. Arrangements may be put in place so as to ensure that the order of the animal(s) does not change during the enrolment process i.e. a walkway may be dimensioned such that animal(s) pass through the walkway in single file and therefore ensure the animal(s) cannot overtake one another as they walk through the walkway thereby enabling to keep track of the animal(s). The additional source may be a manual recording of the animal identification IDs by an operator or reading of a radio frequency, RFID, tag 360 using an external RFID reader.

The enrolment data may then be stored in a computer readable format, e.g. JavaScript Object Notation (JSON), extensible mark-up language (XML) and the like and may contain a list of animal identifications in the order they passed under the camera 110, 330. The camera footage associated with this enrolment may then be passed through a video processing algorithm of the image processing device (platform) 130. The video processing algorithm may then be adapted to perform at least the following tasks:
  i) each video frame is passed into a previously trained object detection network 530 which creates a bounding box and segmentation mask for each animal instance/image detected in each video frame
  ii) the bounding boxes generated for each animal are then passed into an object tracking algorithm 530 which groups multiple bounding boxes across frames and assigns them an arbitrary, unique identification, UID, 540 which corresponds to an individual animal in the footage
  iii) for each animal detected in the video recording, at least ten bounding boxes may be selected from corresponding number of frames which are extracted as images.

The animal(s) detected as above may then be sorted by an order they appeared in the footage and synced up with the actual animal identifications, IDs, 550 as obtained earlier from the additional source (not shown). The synced-up identifications from the enrolled animals may be used as training data in conjunction with the images extracted in step iii) for classification network at step 560.

The trained ID classification network 570 processes new video footage as per steps (i)-(iii) above. For each animal detected in the video recording, each image generated at step (iii) may be passed through the trained ID classification network 570 to produce an array of matching probabilities for each of the enrolled animals. These probabilities may then be averaged over a number of images e.g. five, ten or more images extracted in step iii) above from the video frames to generate one probability array for the detected animal. Once all the footage has been processed, the probabilities for each animal are post-processed in order to assign the most likely ID to that animal based on the probabilities for all other animals. By post-processing the probability arrays generated for each animal it is possible to prevent assigning the same ID to more than one animal. Furthermore, post-processing allows to check for animals that may have a low probability score, which may not have been enrolled in the system or there may be an issue with the enrolment data. In this way, by assigning a unique identification, UID, the system provisions a means for easily detecting each individual animal amongst a plurality of animals by enabling a unique identification to be assigned to each animal therefore avoiding potential issues, such as, mistaken identity and therefore preventing assignment of a mobility score to the wrong animal. As such, based on the enrolment data the system may detect the identify of each individual animal without the need of manual intervention e.g. reading the RFID tags, and the like.

Figure 8:
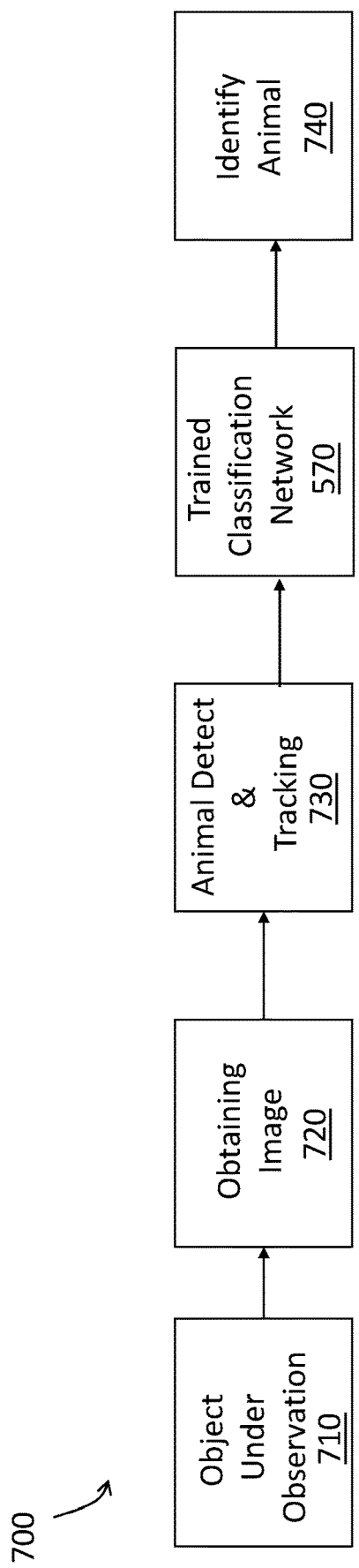
FIG. 8 is a exemplified process flow for identifying an individual animal in a population of animals using the trained ID classification network according to embodiments of the present invention.

FIG. 8 illustrates an exemplified process flow 700 for identifying an animal that may be based on a previously trained ID classification network 570. For example, an arrangement for capturing images on an animal 710 may be provided as per the arrangement discussed with reference to FIG. 3. The arrangement may be configured to capture video footage 720, 110, 330 of a plurality of animals or an individual animal. Said video footage may then be analysed by an image processing platform 130. The image processing platform may then utilize object detection and object tracking algorithms 730, such as those previously discussed, so as to detect and track the animal(s) within the video footage. Data for the animal(s) detected and tracked by the image processing platform may then be processed by the trained ID classification network 570. In this way, new footage obtained by the video capturing device may be processed by the arrangement illustrated so as to assign at step 740 an identity of the animal(s) in the new footage using a previously trained ID classification network 570. This provides a way to check for animal identifications which likely have not been enrolled in the system.

Referring now to FIG. 9, illustrated is an example arrangement in which a trained ID classification network is utilized to identify the individual animal. Illustrated in the diagram is a number of bounding boxes of the same animal from different subsequent frames 400_1 through to 400_n, similar to those as illustrated in FIG. 4C. Each individual bounding box is passed through the trained ID classification network 570 as previously described with reference to FIGS. 7 and 8. For each bounding box a corresponding number of probabilities are generated 575_1 through to 575_n, indicative of animal's identity with respect to the ID of animals registered during the enrolment phase e.g. cow #0001 to cow #0003. The probabilities produced for each bounding box may add up to a value of predetermined value e.g. 1.0. For example, as shown in the first probability table 575_1, the animal in the bounding box 400_1 has a 0.9 probability of being assigned the registered ID cow #0001, a 0.1 probability of being assigned the registered ID cow #0002, and a 0.0 probability of being assigned the registered ID cow #0003. Similarly, as shown in second probability table, the animal represented in bounding box 400_2 has 1.0 probability of being assigned the registered ID cow #0001. As shown in probability table 575_3, the registered ID cow #0002 receives the highest probability value of 0.4. In order to associate the animal represented in the bounding boxes 400_1 to 400_n to a registered ID, the probabilities generated by the trained ID classification network 570 for each bounding box 400_1-n are combined. The registered animal ID with the highest combined probability is taken as the registered ID for the animal represented in bounding boxes 400_1 to 400_n. In the example shown in FIG. 9, cow identity number 0001 is taken as the identity 740 of the animal represented in the bounding boxes 400_1 to 400_n, as it was the registered ID with the highest combined probability.

Figures 10A, 10B:
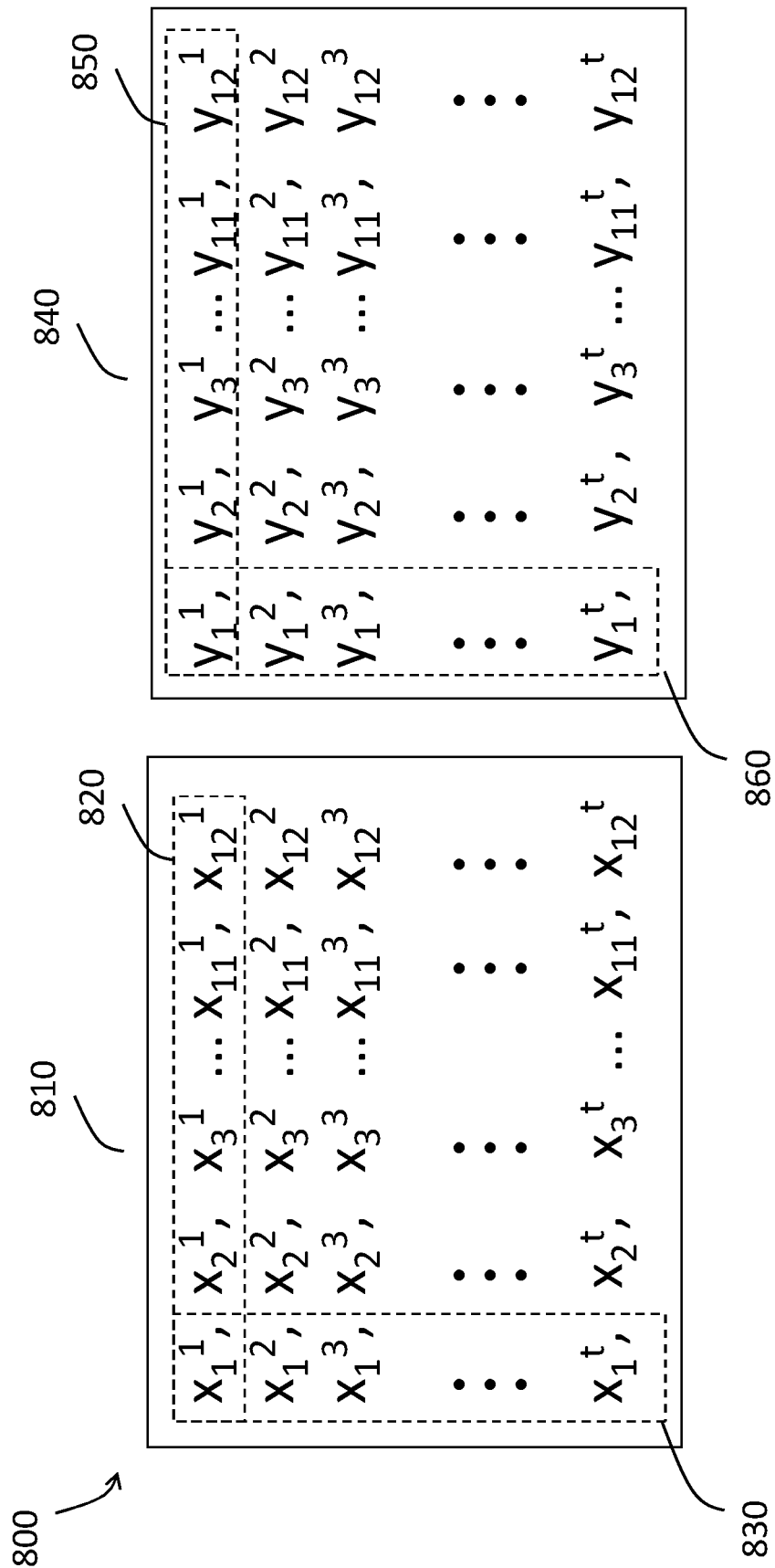
FIGS. 10a and 10b illustrates an example arrangement of extracted coordinates of reference points associated with body parts of the animal according to embodiments of the present invention.

Referring now to FIGS. 10a and 10b, illustrated is an example of the coordinate values 800 obtained for an individual animal by the extraction means according to embodiments of the present invention. In the example shown, there is a first array 800 and a second array 840. The first array comprises rows 820 wherein the rows store, per the illustrated example, the x coordinate values of the reference points extracted via the image processing platform whilst the columns 830 shown represent the number of segmented frames obtained from the video footage captured by the imaging device. Conversely, the second array comprises rows 850 wherein the rows store, per the illustrated example, y coordinate values of the reference points extracted via the image processing platform whilst the columns 860 shown represent the number of segmented frames obtained from the video footage captured by the imaging device. Although the arrangement defines the x and y coordinates in the manner as shown, the information may presented or obtained in any other manner known to the person skilled in the art such that the information may be further analysed to determine a mobility score for the animal based on the information obtained by the imaging device. The size of the arrays may be adapted by the number of reference points being analysed and the number of segmented frames from the video footage or any combination thereof.

Figure 11:
FIG. 11 illustrates an example arrangement of the combined matrix of the extracted coordinates of reference points associated with body parts of the animal according to embodiments of the present invention.

Referring now to FIG. 11, illustrated is an example of a third array 860 for an individual animal based on the combined x and y coordinate values and the segmented frames of FIGS. 10a and 10b. In the arrangement shown, the first array 810 and the second array 840 may be combined thereby providing a third multi-dimensional array in which the x coordinate values and the y coordinate values of each reference point are grouped together forming an array as illustrated. The third array may be processed by a convolutional neural network configured to calculate a mobility score of the animal based on variances identified in the x and/or y coordinate values of at least some of the reference points across the set of individual frames and/or relationship between the x and y coordinates values of each reference point. In this way, deep learning algorithms may be employed for processing the images to determine the mobility levels of an animal. For example, images of the animal from the frames may be processed to assign importance to various aspects/objects of the reference points extracted.

Figure 12:
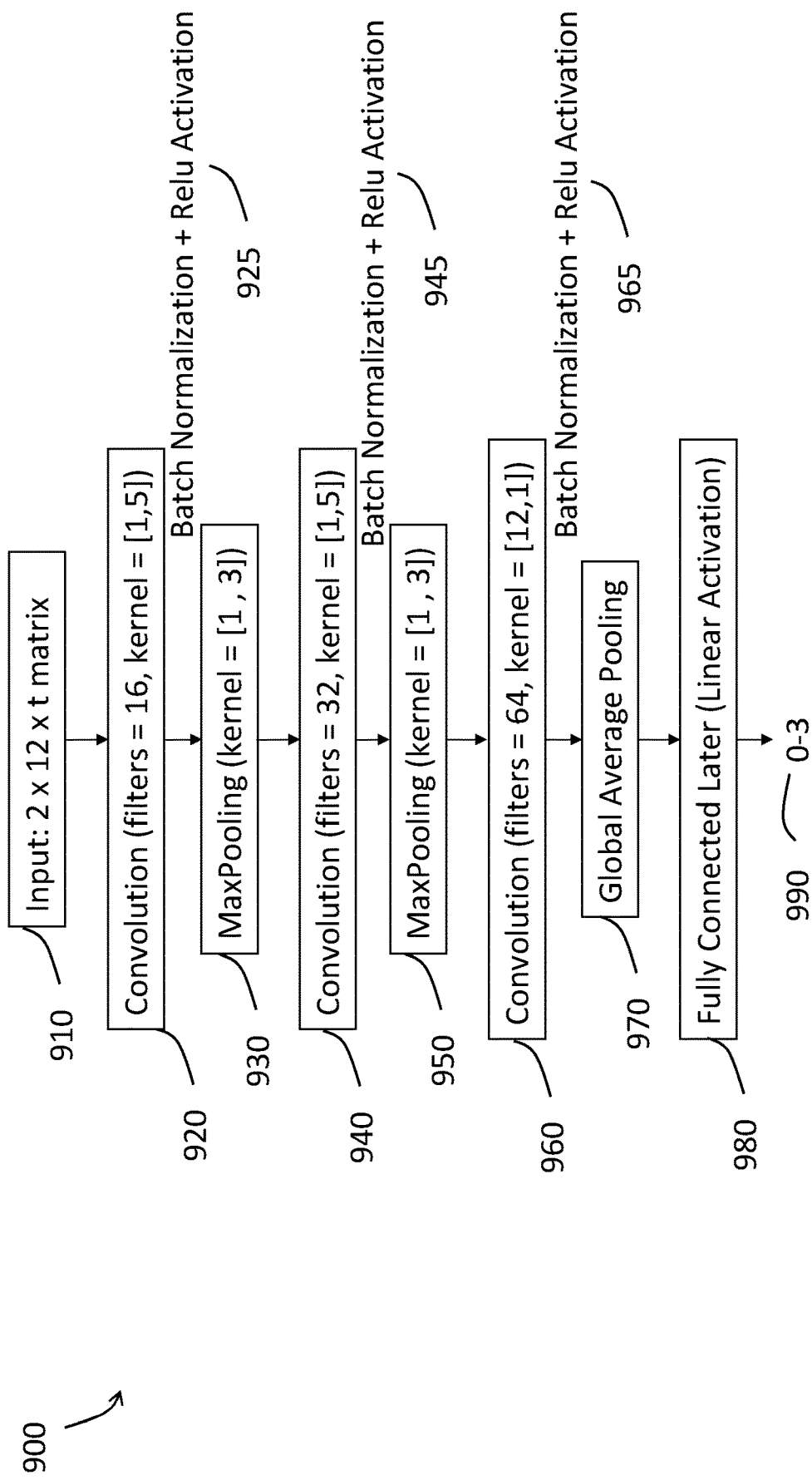
FIG. 12 is an exemplified process flow for determining a mobility score of an animal from the reference point data using a convolutional neural network according to embodiments of the present invention.

FIG. 12 illustrates an example of a process flow 900 performed by a trained convolutional neural network on the third array 860 to determine the mobility score of an individual animal. For example, the convolutional neural network may determine the mobility levels of an individual animal based on variances in the x and y coordinate values of each reference point across the individual frames and/or a relationship between the x and y coordinate values of the reference points across the individual frames.

For example, the system may be trained to determine mobility score of an animal based on the movement obtained from corresponding reference points for individual animal body parts or group of body parts. The movements may include the degree of variance of spinal curvature, the degree of head movement, how erratic the movement of pin and hook bones is relative to their left and right counterparts and so on. In the arrangement shown, the third array 860 is provided as an input 910 to the convolutional neural network. The steps for determining the mobility score of the animal comprise performing, by means of a convolutional neural network, successive convolution and pooling iterations 920, 930, 940, 950, 960 on the x and y coordinate values of the extracted set of reference points corresponding to each individual frame of the input data 910. The initial values for the kernel and filter are randomly selected and are gradually refined through the training of the network on the provided data. Following each convolution, a batch normalization and a rectified linear unit (ReLu) activation may be performed at steps 925, 945, 925. Following the successive convolution and pooling iterations an average pooling on the output may be performed at step 970. At step 980, a linear activation may be performed on the output of the average pooling operation. Following the linear activation, a score indicating the mobility score of the animal is generated at step 990. In this way, the initial filtering and max pooling performed by the successive convolution and pooling iterations is passed along the temporal axis, wherein the temporal axis may be indicative of movement across the third array input matrix from one reference point to another reference point, for example from the head to the ear to the tail and so on, with a final filtering process along the feature's axis, wherein the feature's axis is indicative of movement down the third array matrix, moving from frame one to two to three and so on, before being passed to a final fully connected layer with linear activation within the image processing platform. The final result of the analysis is the generation of a mobility score e.g. a floating-point number between 0.0 and 100.0, indicating the level of mobility. For example, a score of 0.0 may indicate an animal with a high degree of mobility, whilst a score of 100.0 may indicate a poor degree of mobility. These values may be translated using thresholds to other measures. For example, a 0.0 may be translated to a ROMS score of 0, which may indicate absence or a low degree of lameness whilst a 100.0 may be translated to a ROMS score of 3 signifying a high degree of lameness in the animal. In this way, insights based on the score determined by the CNN may be delivered to, for example, an end user of the system in a notification and optionally in an actionable format e.g. a list of animals may be printed or emailed to a vet, or a text to the farmer for urgent alerts.

In certain alternative embodiments, the functions and/or acts specified in the flowcharts, sequence diagrams, and/or block diagrams may be re-ordered, processed serially, and/or processed concurrently without departing from the scope of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

What is claimed is:

1. A method for monitoring mobility levels of an individual animal, the method comprising:
   obtaining a video recording of an animal moving through a space, the video recording captured by a two-dimensional imaging device from an overhead angle;
   extracting, from the video recording using an image processing device, a set of reference points, each reference point being associated with a body part location of the animal, wherein the step of extracting comprising:
      segmenting the video recording into a set of individual frames,
      detecting, in each frame, an instance representing a body shape of the animal;
      identifying, on the detected instance in each individual frame, a set of reference points, wherein identifying the set of reference points comprises applying a pre-calculated segmentation mask on the instance representing the body shape detected in each individual frame, and
      extracting corresponding x and y coordinate values for each reference point, the x and y coordinate values being indicative of a position of each refence point in an individual frame; and
   determining, by means of a trained neural network, a mobility score for the animal based on at least the relative position of the reference points between individual frames, wherein the mobility score is indicative of the mobility level of the animal.

2. A method according to claim 1, wherein the step of detecting an instance comprising:
   generating a bounding box around each detected instance of the animal body in each frame; and
   tracking, based on the bounding boxes generated, the movement of the animal across the individual frames to determine whether the movement of the animal through the space was continuous or interrupted;
   wherein, when the movement of the animal is detected as being continuous, then the method continues to the step of identifying the reference points in each detected instance, otherwise the method continues to a next animal detected in the video recording.

3. A method according to claim 1, wherein the step of extracting the x and y coordinate values comprising:
   generating at least a first array and a second array for each individual frame,
   the first array comprising the x coordinate values of the reference points in each individual frame, and
   the second array comprising the y coordinate values of the reference points in each individual frame; and
   combining the values in the first and second arrays to create a third multi-dimensional array of x and y coordinate values having a size defined by the number of individual frames and the number of reference points.

4. A method according to claim 3, wherein the step of determining the mobility score of the animal comprises processing the third multi-dimensional array by means of a convolutional neural network to classify the movement of the body part locations of the animal across the set of individual frames.

5. A method according to claim 1, wherein the step of determining the mobility score of the animal comprising:
   performing, by means of a convolutional neural network, successive convolution and pooling iterations on the x and y coordinate values of the extracted set of reference points corresponding to each individual frame;

performing, by means of a convolutional neural network, an average pooling of the output from the successive convolution and pooling iterations;

performing a linear activation of the output from the average pooling operation; and generating a mobility score indicating the mobility level of the animal.

6. A method according to claim 1, wherein the set of individual frames comprising at least twenty frames.

7. A method according to claim 1, wherein each reference point is associated with an animal body part selected from anyone of a head, a neck, a back, pin bones, ears, or a tailhead of the animal.

8. A method according to claim 1, wherein the set of reference points comprise at least twelve reference points distributed across the detected instance of the body of the animal.

9. A method according to claim 1, wherein the method further comprises:

an enrolling step to assign a unique ID to each individual animal from a plurality of animals, the enrolling step comprising detecting each animal of the plurality of animals based on the video recording; and assigning a unique identification, UID, to each detected animal of the plurality of animals in the video recording.

10. A method according to claim 9, wherein assigning the UID to each detected animal comprises processing the video recording using an object detection algorithm configured to at least create a bounding box and a corresponding segmentation mask for each animal in the video recording.

11. A method of determining a mobility score of an animal according to claim 1, wherein step of determining a mobility score comprises assigning the mobility score to an animal identified in an enrolment step.

12. A method according to claim 11 wherein the animal identification step comprises:

processing the instances of the detected animal in each video frame;

creating a bounding box and a corresponding segmentation mask for each instance of the detected animal;

extracting a number of images from selected bounding boxes;

processing each image through a trained ID classification network configured to assign an ID matching probability for each unique ID of an enrolled animal;

averaging the ID matching probabilities generated for each image; and assigning to the animal detected in the video recording the ID of an enrolled animal with the highest probability.

13. A system for determining a mobility score of an animal, the system comprising:

means for obtaining a video recording of an animal moving through a space, the video recording captured by a two-dimensional imaging device from an overhead angle;

an animal detection system configured for determining a mobility score associated with the mobility level of the animal;

a user device communicatively coupled to the animal detection system and configured to receive information associated with the mobility score of the animal;

wherein the animal detection system comprises at least one processor configured to perform the method of claim 1.

14. An animal farm comprising the system according to claim 13.

15. A method for detecting lameness in an individual animal by monitoring the mobility level of the individual animal, the method comprising:

obtaining a video recording of an animal moving through a space, the video recording captured by a two-dimensional imaging device from an overhead angle;

extracting, from the video recording using an image processing device, a set of reference points, each reference point being associated with a body part location of the animal, wherein the step of extracting comprising:

segmenting the video recording into a set of individual frames, detecting, in each frame, an instance representing a body shape of the animal;

identifying, on the detected instance in each individual frame, the set of reference points, wherein identifying the set of reference points comprises applying a pre-calculated segmentation mask on the instance representing the body shape detected in each individual frame, and extracting corresponding x and y coordinate values for each reference point, the x and y coordinate values being indicative of a position of each refence point in an individual frame; and determining, by means of a trained neural network, a mobility score for the animal based on at least the relative position of the reference points between individual frames, wherein the mobility score is indicative of the mobility level of the animal, and determining the lameness of the animal from the mobility score.

16. A method according to claim 15, wherein the step of detecting an instance comprising:

generating a bounding box around each detected instance of the animal body in each frame; and tracking, based on the bounding boxes generated, the movement of the animal across the individual frames to determine whether the movement of the animal through the space was continuous or interrupted;

wherein, when the movement of the animal is detected as being continuous, then the method continues to the step of identifying the reference points in each detected instance, otherwise the method continues to a next animal detected in the video recording.

17. A method according to claim 15, wherein the step of extracting the x and y coordinate values comprising:

generating at least a first array and a second array for each individual frame, the first array comprising the x coordinate values of the reference points in each individual frame, and the second array comprising the y coordinate values of the reference points in each individual frame; and combining the values in the first and second arrays to create a third multi-dimensional array of x and y coordinate values having a size defined by the number of individual frames and the number of reference points.

18. A method according to claim 15, wherein the method further comprises:

an enrolling step to assign a unique ID to each individual animal from a plurality of animals, the enrolling step comprising detecting each animal of the plurality of animals based on the video recording; and assigning a unique identification, UID, to each detected animal of the plurality of animals in the video recording.

19. A method according to claim 13, wherein the step of detecting an instance comprising:

generating a bounding box around each detected instance of the animal body in each frame; and tracking, based on the bounding boxes generated, the movement of the animal across the individual frames to determine whether the movement of the animal through the space was continuous or interrupted;

wherein, when the movement of the animal is detected as being continuous, then the method continues to the step of identifying the reference points in each detected instance, otherwise the method continues to a next animal detected in the video recording.

20. A method according to claim 1, wherein the step of extracting the x and y coordinate values comprising:

generating at least a first array and a second array for each individual frame, the first array comprising the x coordinate values of the reference points in each individual frame, and the second array comprising the y coordinate values of the reference points in each individual frame; and combining the values in the first and second arrays to create a third multi-dimensional array of x and y coordinate values having a size defined by the number of individual frames and the number of reference points.

* * * * *